Nov. 9, 1965                L. HUNTER                3,216,530
                        VEHICLE SERVICE RACK
Filed April 12, 1962                              6 Sheets-Sheet 1
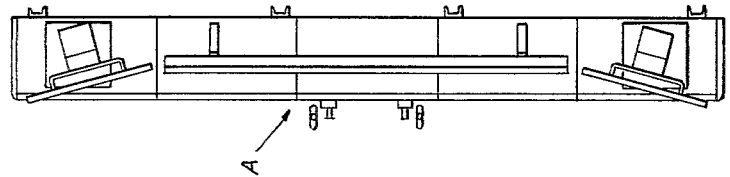
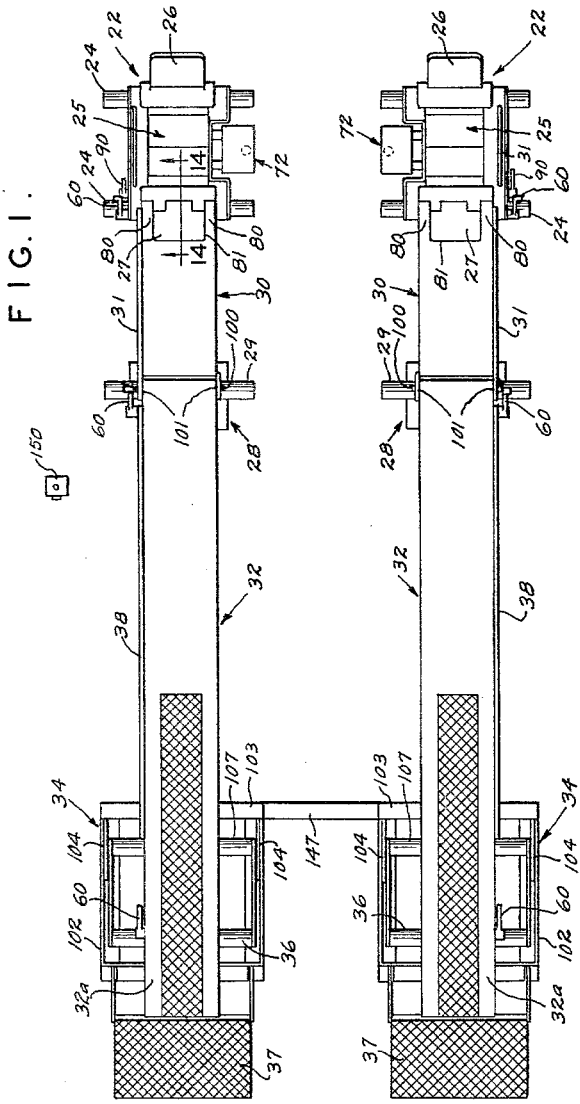
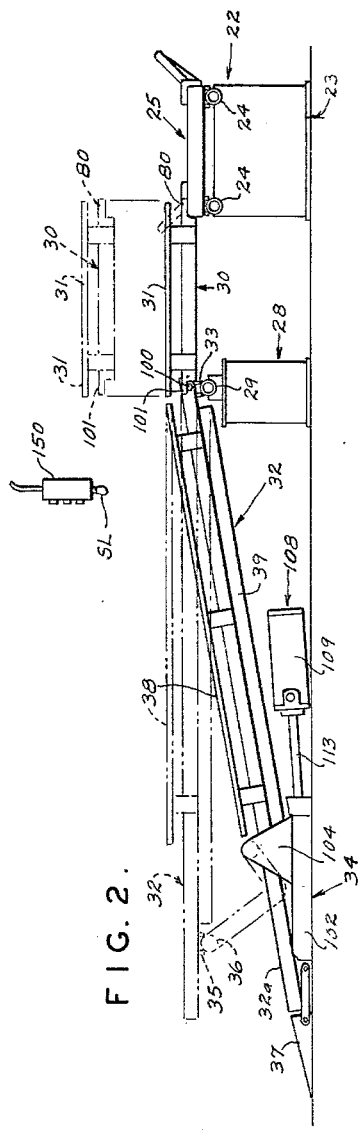
INVENTOR.
LEE HUNTER
BY
Gravely, Lieder & Woodruff
ATTORNEYS Nov. 9, 1965

L. HUNTER 3,216,530

VEHICLE SERVICE RACK

Filed April 12, 1962

*INVENTOR.*
LEE HUNTER
BY
Gravely, Lieder & Woodruff
ATTORNEYS

Nov. 9, 1965 L. HUNTER 3,216,530
VEHICLE SERVICE RACK
Filed April 12, 1962 6 Sheets-Sheet 3
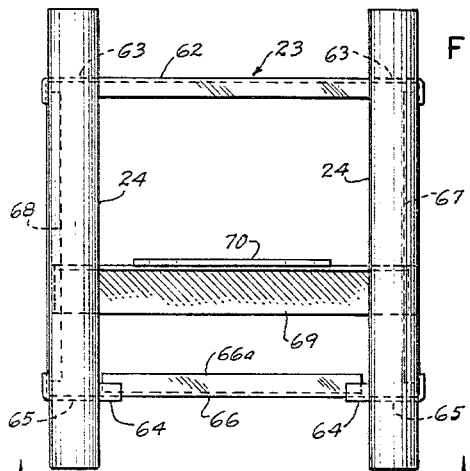
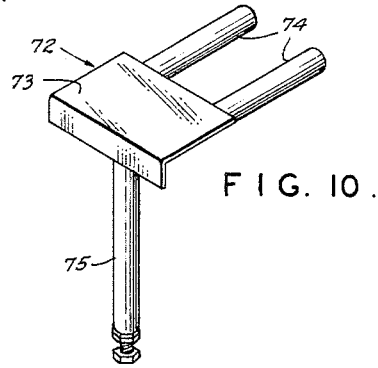
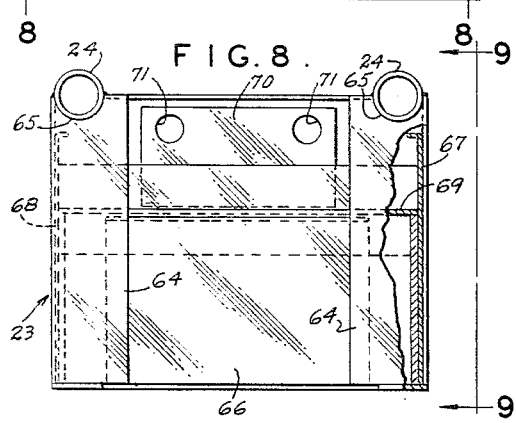
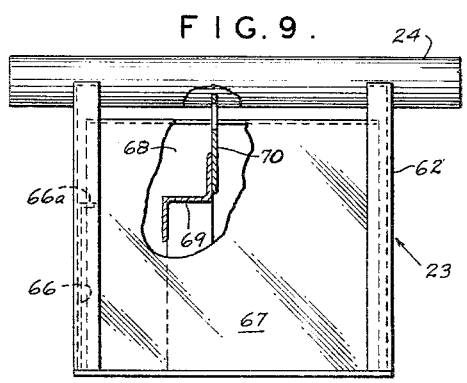
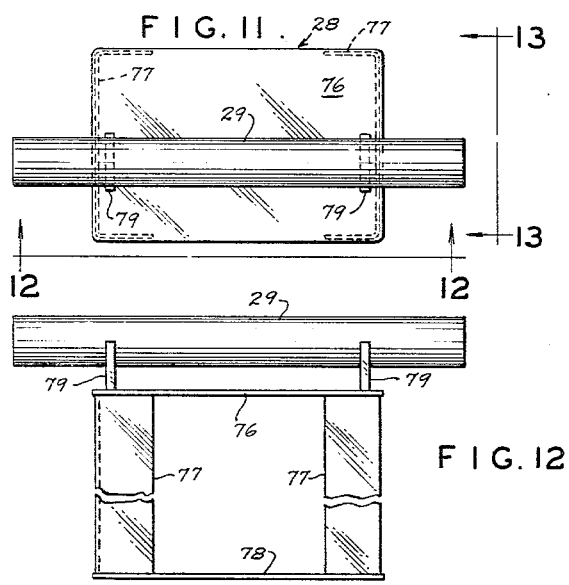
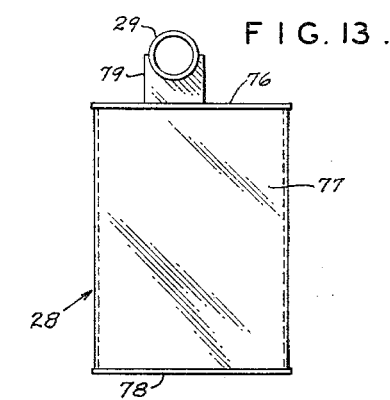
*INVENTOR.*
LEE HUNTER
BY
*Gravely, Lieder & Woodruff*
ATTORNEYS INVENTOR.
LEE HUNTER
BY
*Gravely, Lieder & Woodruff*
ATTORNEYS

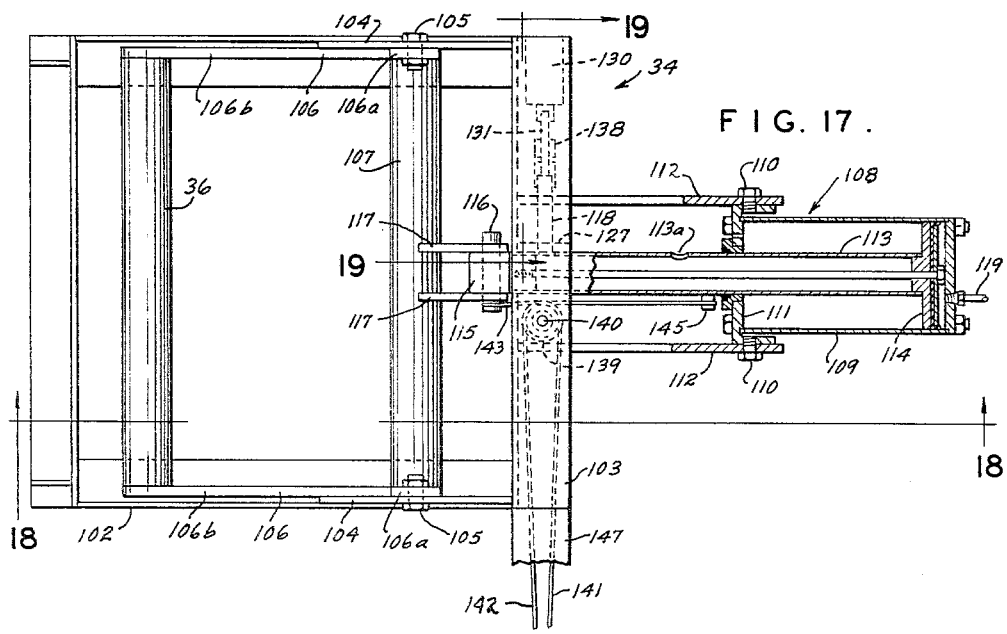

INVENTOR.
LEE HUNTER 3,216,530
VEHICLE SERVICE RACK
Lee Hunter, Rte. 1, Box 136, Creve Coeur, Mo.
Filed Apr. 12, 1962, Ser. No. 187,012
2 Claims. (Cl. 187—8.71)

This invention relates to improvements in vehicle service racks for facilitating servicing and care of vehicles.

Vehicle service racks, hoists and elevated runways take many forms, but there are certain common problems which the present improvements are believed to overcome in novel and unique ways. The problems usually encountered are in the requirement that there be large areas for present types of racks and hoists, in the need for expensive permanently installed equipment, in the large first cost involved due to size of structure and power units needed to lift or support heavy vehicles in order to encompass a range of utility for a great number of vehicles, and in the need for high ceiling shop areas in which to install the usual high lift equipment offered. These and other problems may be overcome by a sturdy, versatile service rack having a compact structure for a minimum of head space and floor area, and it is an important object of this invention to provide a vehicle service rack which possesses these characteristics.

It is also an important object of this invention to provide a vehicle service rack with a series of components which may be utilized together or separately so as to offer the purchaser thereof a choice of equipment to suit the shop or service areas available.

It is an object of this invention to provide a vehicle service rack capable of supporting a vehicle at a low level but so that the under side may be easily, quickly and conveniently racked without requiring high lift equipment so that a larger number of service shops may have the advantages of the rack at only a minimum of first cost and without complicated installation.

A more specific object of this invention is to provide a vehicle service rack in the form of components which may be purchased in separate units to suit the needs of the particular service specialty offered by service shops, and may be purchased in progressive stages as the service facilities of a shop need to be enlarged or extended.

A preferred form of the invention has been selected for disclosure herein, but this is not to be taken as limiting the scope of the invention in any unnecessary manner. The preferred form or embodiment includes a set of front stand units for the steerable wheels of a vehicle, which units may be set in a shallow floor pit or may be free standing on a service floor. The front stand units are provided with detachable runway bridges for supporting the vehicle wheels during placement on the front stand units but which may be removed to facilitate service access to all sides of the vehicle wheels. The preferred embodiment also includes a set of intermediate stands which are cooperative with the front stand units and detachable bridges when the same are used in the free standing installations, and a set of lift runways operatively connected to the intermediate stands and having powerful hoist units associated therewith for lifting and levelling the vehicle for all-around service access.

The invention may also consist in such parts, components, sub-assemblies and units as will be more particularly disclosed and described in the following specification and with reference to the details shown in the accompanying drawings, wherein:

FIG. 1 is a plan view of a vehicle service rack installation and accessory units to illustrate one typical installation of a free standing floor assembly including front stand units, intermediate stands, runway bridges, lift runways and hoist units;

FIG. 2 is a longitudinal side view of the rack assembly shown in FIG. 1;

FIG. 7 is a top plan view of the base of one front wheel stand unit with the wheel carriage removed for clear disclosure thereof;

FIG. 8 is an elevational view of the base as seen at line 8—8 in FIG. 7, with portions shown in section;

FIG. 9 is another elevational view of the base as seen at line 9—9 in FIG. 8, with portions shown in section;

FIG. 10 is a perspective view of an accessory useful with the base shown in FIG. 7, the same being shown in operative position in FIG. 1;

FIG. 11 is a top plan view of an intermediate stand;

FIG. 12 is a foreshortened elevational view of the intermediate stand seen at line 12—12 in FIG. 11;

FIG. 13 is another elevational view of the intermediate stand seen at line 13—13 in FIG. 11;

FIG. 17 is a greatly enlarged plan view of a hoist unit for the lift runway shown in FIG. 1;

FIG. 18 is a partly sectional elevational view of the hoist unit seen at line 18—18 in FIG. 17;

FIG. 19 is an enlarged fragmentary elevational view of the hoist unit safety lock seen at line 19—19 in FIG. 17.

Figure 3:
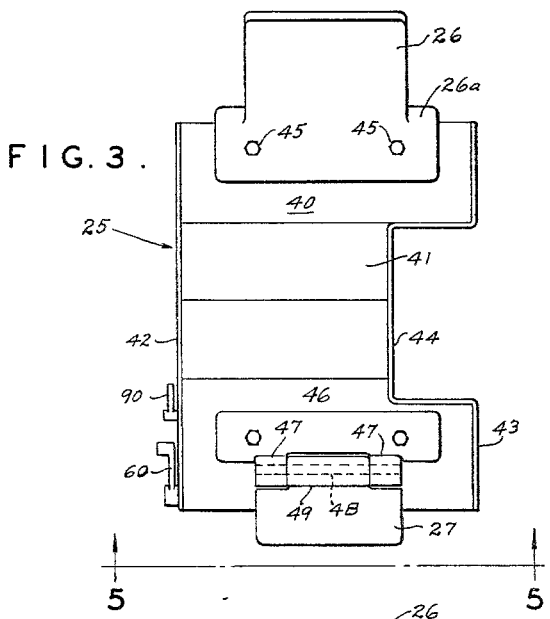
FIG. 3 is a plan view of the wheel carriage for one front stand unit of a pair thereof.

Now with reference to FIGS. 1 and 2, the preferred embodiment of the vehicle service rack includes a spaced pair of front stand units 22 each having a base 23 carrying spaced roller rails 24, and a wheel supporting carriage 25 mounted thereon. The wheel carriages 25 are provided with fixed wheel stops 26 and movable safety chocks 27. Spaced from the front stand units 22 are intermediate stands 28 having a single roller rail 29 in fixed position thereon. The front stand units 22 and intermediate stands 28 are interconnected by removable wheel runway bridges 30. Each such bridge is provided with a side rail 31 to assist in guiding the wheels over the bridges and onto the carriages 25.

In cooperation with the foregoing units are a spaced pair of lift runways 32, each having a pair of rollers 33 at the forward high ends to rest upon the rails 29 of the intermediate stands 28. The rails 29 and rollers 33 form pivot fulcrums for the runways 32 to permit the runways 32 to move between the lower full line positions and the elevated broken line positions (FIG. 2). The run-on ends 32a of the runways 32 are operably supported by powerful hoist units 34, as by rollers 35 on the under sides of the ends 32a resting upon rails 36. Each hoist unit 34 is provided with a suitable wedge-shaped apron 37 to form an approach to the ends 32a. Each lift runway 32 is provided with a wheel guiding side rail 38, and the under side of each runway is suitably strengthened by a box-section reinforcement member 39 extending lengthwise thereof.

In the following description relating to the details of the parts and components heretofore pointed out in FIGS. 1 and 2 it shall be understood that the same are constructed as right and left parts or components, but the same numerals of reference will apply to either. It should also be understood that a description of one part or component will be deemed sufficient for present disclosure. The present embodiment of FIG. 1 is shown in association with wheel alignment service facilities at A, but no details of this portion of the disclosure is necessary to an understanding of the service rack per se.

Turning now to FIGS. 3, 4, 5 and 6, the wheel supporting carriage 25 for the left side of a vehicle, as viewed in FIG. 1, comprises a suitable platform 40 having a wheel centering V-shaped seat 41 therein. The platform is framed by sides 42 and 43, the side 43 being notched or inwardly off-set at 44 for a purpose to appear. The forward end of the platform 40 supports the fixed wheel stop 26 which is suitably secured by bolts 45. The stop 26 may be a casting having a corner type base 26a for increased strength. The opposite end of the platform supports a fixed pivot block 46 having bearing ears 47 to receive a pivot pin 48 for operatively connecting the safety chock 27 which may move from its lowered position (FIG. 4) to a raised position as in FIG. 14. The carriage 25 is provided with a plurality of rollers 50 which are adapted to engage upon the tubular rails 24 (FIG. 1). Each roller 50 is formed with a curved tread to seat on the rails. To secure the rollers on the rails the carriage at its forward end is provided with fixed depending brackets 51 and a bolted-on retainer plate 52 having a curved form to snuggly embrace the adjacent underside of rail 24 with little or no frictional restrain on the movement of the carriage on the rail 24. The opposite end of the carriage 25 is provided with depending brackets 53 which support an adjustable clamp plate 54 which serves to engage the adjacent rail 24 and secure the carriage in proper position to match the vehicle wheel spacing. The clamp plate 54 is provided with a drag link 55 which extends through the flange of the plate 54 and the overlying flange on bracket 53 and terminates in a bearing eye 56. An actuating rod 57 mounted in bearing elements 58 and 59 has a handle 60 on its outer end, while the inner end 61 is off-set to form a crank for raising or lowering the clamp plate 54 by engaging in the drag link eye 56.

The base 23 for supporting carriage 25 is formed of suitable structural plates to provide a load bearing box assembly of the character shown in FIGS. 7, 8 and 9. The box is formed by an end wall 62 having arcuate cut-outs at 63 to provide seats for the tubular rails 24, two similar corner posts 64 also having arcuate seats 65 for the rails 24, and suitable filler wall plates 66, 67 and 68. The wall plate 66 has an upper flanged edge 66a spaced below the elevation of the rails 24 so that an opening is formed for access to the interior of the box assembly. A Z-shaped beam 69 is secured within the box between side wall plates 67 and 68, and a guide plate 70 is secured thereto such that apertures 71 therein are aligned with the opening above the wall flange 66a. The opening is turned to face inwardly toward the base 23 for the opposite carriage stand unit 22.

As shown in FIGS. 1 and 10, the base 23 is provided with an adjustable jack stand 72 consisting of a plate 73, a pair of slide rods 74 and an adjustable leg 75. The rods 74 are slidably mounted in the apertures 71 of the guide plate 70 carried by the Z-shaped beam 69 and the leg rests on the floor or surface of the area for the rack assembly. The jack stand 72 is provided for carrying a vehicle lift jack (not shown) which is used during certain wheel adjustment operations. The slide rods 74 allow a suitable degree of in or out placement of the jack stand 72 relative to the wheel carriage 25. It is pointed out that the jack stand 72 may be located below the notch 44 of carriage 25 so that a jack can be located close to the vehicle wheel.

In FIGS. 11, 12 and 13 there is shown the structure of one of the intermediate stands 28. As shown, the stand 28 has a top plate 76 supported on vertical plates 77, and a base plate 78. These plates are suitably secured together to form a strong load carrying stand for supporting the tubular rail 29 in seat elements 79. The stand 28 is spaced from the front stand unit 22 such that the removable runway bridge 30 may span the gap. As shown in FIG. 2, the bridge 30 has a front extension 80 which rests on an edge of the wheel supporting carriage 25 at each side of the pivoted safety chock 27 (FIG. 1), and such extension is formed with a suitable recess 81 to receive the chock 27 when in its lowered position and allow the chock to lie flush with the bridge runway surface.

Figure 14:
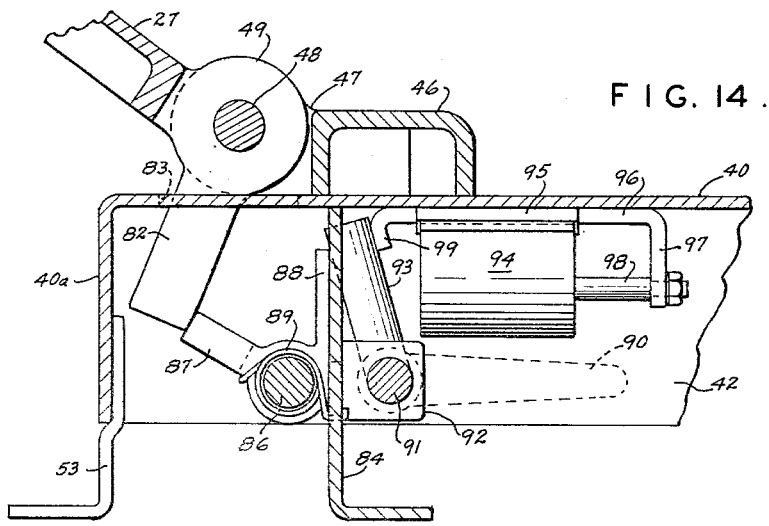
FIG. 14 is a greatly enlarged, fragmentary sectional elevational view of a wheel safety chock and its operating means, the view being taken at line 14—14 in FIG. 1.
Figure 15:
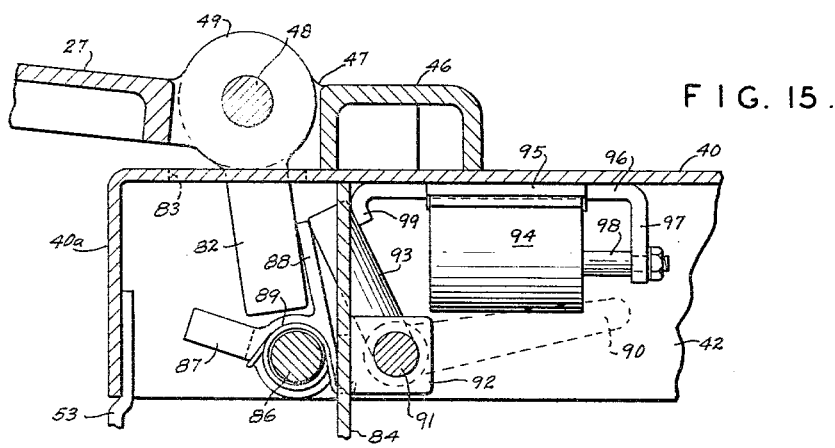
FIG. 15 is a view similar to FIG. 14 but showing the same in moved condition.
Figure 16:
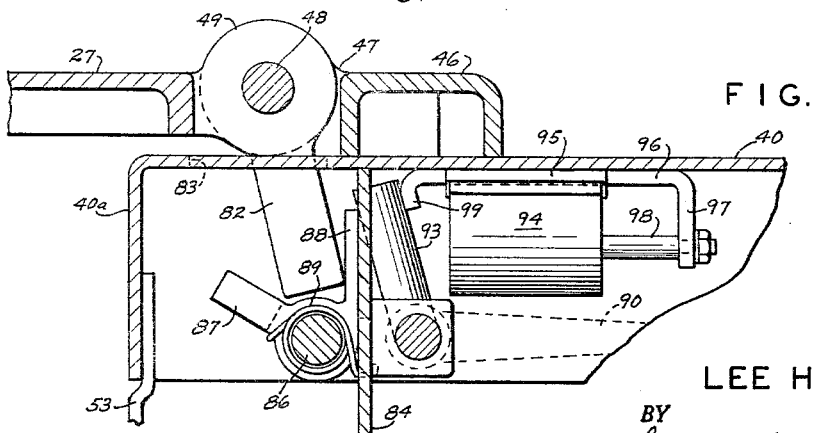
FIG. 16 is a further view similar to FIG. 14 but showing a further moved condition.

The arrangement and operation of the safety chock 27 is shown in FIGS. 14, 15 and 16. It can be seen that the pivot bearing 49 of the chock is formed with an arm 82 which projects through a slot 83 in the platform 40 and into the space therebelow between a vertical wall plate 84 and the turned down end wall 40a of the platform 40. These walls are joined by transverse walls 85 (FIG. 6) which provide suitable supports for bearings to carry a shaft 86 on which is movably mounted a chock lock having a detent arm 87 and an actuating arm 88 (FIG. 14). The lock is yieldably held by a suitable spring 89 in the position of FIG. 14, but may yield as shown in FIGS. 15 and 16. The lock is actuated by a manual crank 90 located at the exterior of the carriage 25 (FIGS. 3 and 6), such crank 90 being connected to a shaft 91 (FIG. 14) carried in suitable bearings 92 such that its inner end 93 is positioned to pass through a slot in the wall 84 to engage the actuating arm 88 on the chock lock.

Assuming the chock 27 is in its down position (FIG. 16), the mechanic may manually lift the chock in a clockwise direction so that the arm 82 is displaced and, in turn, moves the detent arm 87 against spring 89 until it is clear of the arm 87, the arm 87 returning to the position shown in FIG. 14 such that the arm 82 is prevented from moving in the opposite direction. This action is similar to the familiar snap lock on a door. It is not necessary to use the crank 90 in this phase of operation, but for release of the chock 27 the crank 90 can be used to produce movement of the actuating arm 88 through contact by the end 93. The sequence of unlocking motions is illustrated in FIGS. 15 and 16.

An electrical actuator may be provided in conjunction with the manual crank 90. This may take the form of a solenoid motor 94 secured on base means 95 in the form of spaced plates (FIGS. 6 and 14) having a slideway therebetween for guiding a movable actuator 96 connected at one end 97 to the armature arm 98. The opposite end 99 is formed as a pusher to engage on the end 93 of the manually actuated shaft 91 and displace the arm 88 to release the detent 87 in the sequence shown by FIGS. 14 and 15. After release of the detent 87 from arm 82, the chock 27 will fall to its down position (FIG. 16) and the spring 89 will then return arm 88 to the position in which the actuator 96 is retracted. Further reference will be made to the motor means 94 in FIG. 20.

As seen in FIGS. 1, 2, 17, 18 and 19, the lift runways 32 pivot on rollers 33 resting on the rails 29 of the intermediate stands 28. The sides of each runway 32 carry pins 100 (FIG. 2) which support the adjacent ends 101 of the removable bridges 30 and allow movement between the bridges 30 and the runways 32. The runways 32 are raised at the run-on ends 32a by hoists 34, one of which is shown in FIGS. 17 and 18. The hoist includes a suitable floor frame 102 in which a transverse channel member 103 and spaced upright pivot plates 104 are a part. The plates 104 support pivots 105 for a lifting frame composed of dog-leg arms 106, a pusher bar 107 and the rail 36. These parts are secured together such that the arm portions 106a of the dog-leg arm 106 are connected to the pivots 105 and the opposite arm portions 106b normally lie in the floor frame 102 when lowered. The rail 36 is, of course, exposed to engage under the rollers 35 at the run-on end 32a of the runway. While not shown, the rollers 35 are carried on axle rods directed parallel with the length of the runway 32 so that a certain degree of movement of the rollers may take place in that direction to compensate for the angular swing of the arm portions 106b between the full line and broken line positions shown in FIG. 18.

The lifting frame is moved by a suitable piston and cylinder motor means 108, compressed air being the motive fluid in this case. The motor means 108 comprises a cylinder 109 having pivot elements 110 at its forward end 111 to connect with anchor straps 112 at each side. The straps 112 are secured in the channel member 103 and serve to support the cylinder 109 for angular movement about the pivots 110. The end 111 of the cylinder has a suitable gland to receive the rod 113 which is connected to the piston 114. Rod 113 is of tubular construction and is connected to a suitable end element 115 for the pivot pin 116 which connects the element 115 to a pair of arms 117 fixed on the pusher bar 107. As can be seen in FIGS. 17 and 18, the rod 113 passes through the channel member 103, as through an aperture therein, and serves to displace the lift frame in the manner shown. The rod 113 is formed with a side aperture 113a which cooperates with a safety locking pin 118 when the lift frame is in its raised position, thereby taking the vehicle load off the motor means 108. Compressed air is fed to the cylinder 109 by conduit 119, and the other side of the piston 114 is vented to atmosphere at port 120 in the head 111.

Figure 20:
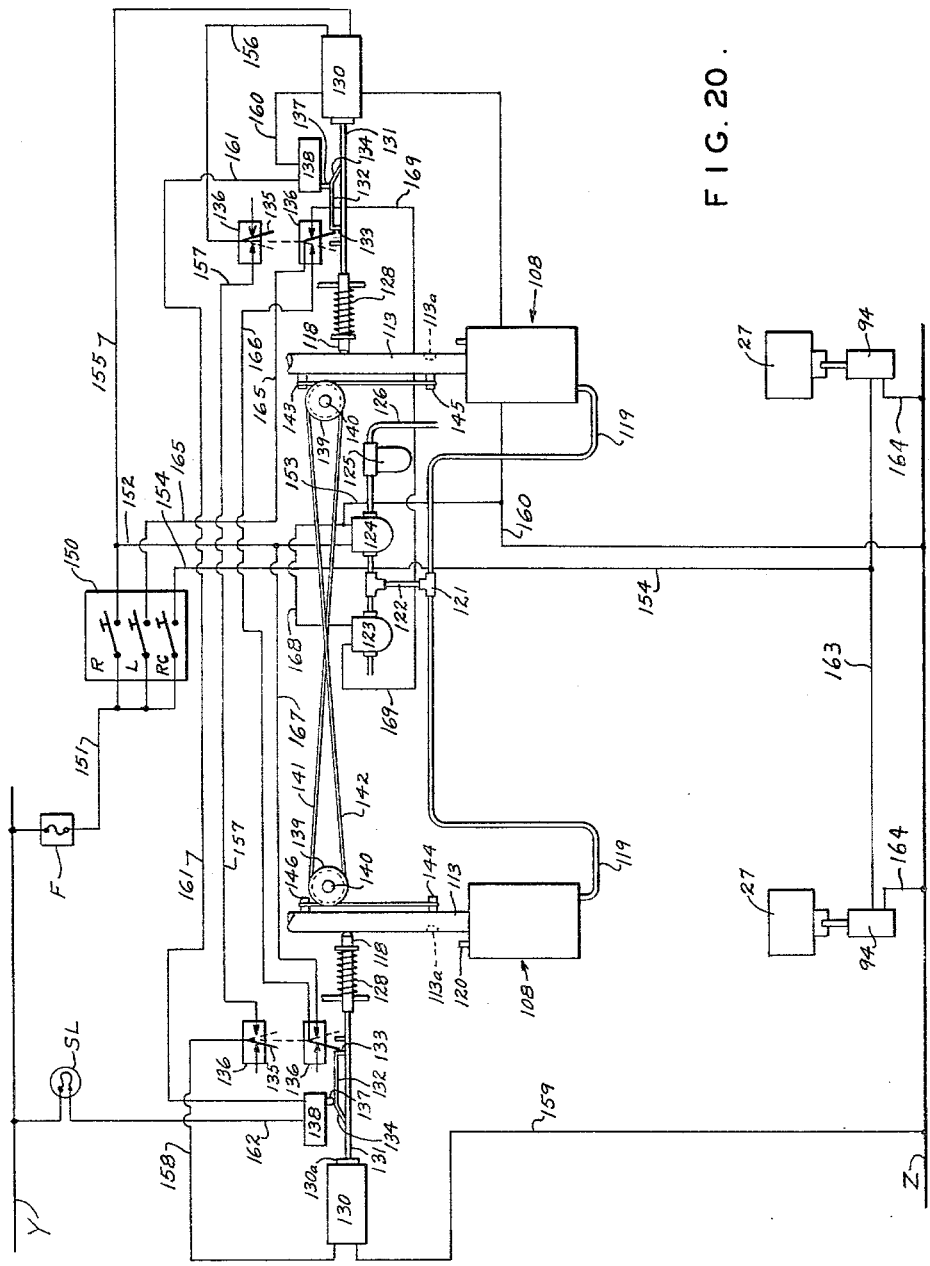
FIG. 20 is a schematic view of the hydraulic and electrical service facilities for the vehicle rack of FIG. 1.

As shown in FIG. 20, the compressed air conduits 119 for each motor means 108 connect at a T fitting 121, in turn, connected to a common pipe line 122 between a normally closed exhaust solenoid actuated valve 123 and a normally closed supply solenoid actuated valve 124. The latter valve connected with a filter unit 125 and through it a supply conduit 126 from a suitable supply of compressed air. When raising the runways 32, valve 124 will open while valve 123 will remain closed. The lowering action is by closing valve 124 and opening valve 123, but due to the normally closed setting for these valves it is possible to halt the raising or lowering of the runways 32 at intermediate positions, and to reverse the direction of movement as desired through a control system to be described presently.

The safety locking pin 118 shown in FIG. 19 and in diagrammatic form in FIG. 20, is slidably mounted in a wall 127 spaced from the anchor strap 112, and it slides in the strap 112 also for suitable guidance. A spring 128 bears upon the strap 112 and upon a collar 129 fixed on the pin 118 such that the pin 118 is urged toward its locked position in the aperture 113a of piston rod 113. The pin 118 is retracted by a solenoid motor means 130 connected by a draft rod 131 on pin 118 to the end of the usual armature 130a. Energization of the motor means 130 withdraws the pin 118 against the spring 128 and allows the piston rod 113 to retract and move its aperture 113a out of alignment with the pin 118. Thereafter, pin 118 rides on the side of rod 113.

The draft rod 131 carries switch actuator means 132 having a recess 133 and a cam surface 134. The recess 133 is adapted to cage the arm 135 of a toggle switch 136, while the cam surface 134 engages the push plunger 137 of a normally open on-off switch 138. Since the locking pin 118 is considered to be normally retracted (as in FIG. 20), the toggle switch arm 135 will be in the leftward position (opposite to that in FIG. 19) and the plunger 137 of switch 138 will be held in to open the switch contacts.

Before proceeding with further details of the control system involving the motor means and switches, reference will be made to the means for causing the cylinders to work in substantial unison so that the two runways 32 will rise and descend together. In FIGS. 17 and 20 it can be seen that pulleys 139, there being two independent pulleys mounted on a common shaft 140 fixed in the channel member 103, are engaged by cables 141 and 142. Cable 141 has one end anchored at 143 on the right hand piston rod 113 (FIG. 20) while the opposite end passed about a left hand pulley 139 and is anchored at 144 on the left hand piston rod 113. The other cable 142 has one end anchored at 145 on the right hand piston rod and the opposite end crosses over the cable 141 and passes around another pulley 139 at the left side before being anchored at 146 on the left hand piston rod. It can be appreciated that any tendency for one piston to advance its rod 113 faster than the companion rod 113 will be constantly equalized through the cable system above described. Since the cables 141 and 142 extend between the two hoist units 34 there is provided a suitable channel member 147 (FIGS. 1 and 17) between the respective channel members 103 to protect the same. The member 147 is also used to protect the electrical lines and air conduits of the system. It is pointed out that the respective cable attachments 143 and 146 may conveniently be the ends of each pin 116 connecting the end 115 of each piston rod to the arms 117.

The arrangement and operation of the control system is diagrammatically shown in FIG. 20 and further reference will now be made to such view. The electrical control system includes the electrical current supply represented by the buss lines Y and Z; the switch control box 150 having normally open switches actuated by push buttons such as R for raising the runways 32, L for lowering the runways 32, and RC for releasing the safety chocks 27. There is also a signal lamp SL for indicating the locked position of the safety locking pins 118 in apertures 113a of the piston rods 113. Assuming a vehicle is on the rack and it is desired to raise the runways 32 to level the vehicle, the mechanic will depress button R and hold it in. On depressing button R, current from buss Y will pass the fuse F along the common lead 151 to lead 152 and solenoid valve 124. From valve 124 lead 153 goes to the opposite buss z by lead 160 to energize valve 124 to admit air under pressure to the manifold 122 and to both conduits 119 so that the motor means 108 will begin raising the runways 32 in substantial unison due to the equalizing system of cables 141 and 142. Current from switch R will also pass along lead 155 to the solenoid motor means 130, and from this means 130 to lead 156 to the center post of normally open double pole-single throw toggle switch 136. The normally open side of (right hand) switch 136 is connected by lead 157 to the other similar (left hand) normally open toggle switch 136 and from the center post of the left hand switch 136 by lead 158 to one side of the left hand solenoid motor means 130. The other side of the latter motor means 130 is connected by lead 159 to the buss Z which is the opposite side of the current supply line. The solenoids 130 are not activated until the pin apertures 113a line up with the safety locking pins 118, and at such time the pins spring home and shift the respective left and right hand control means 132 such that the associated toggle switches 136 close across leads 156 and 157 at the right hand side and across leads 157 and 158 at the left hand side.

This action does two things; first, it energizes the solenoids 130 to retract the pins 118 momentarily but this retraction again opens the toggle switches 136 to allow the pins to again seat. Such action causes a rapid cycling of the solenoids 130 indicating both pins 118 are ready to lock the piston rods 113 so the button R may be released. Second, the shift of the control means 132 at both sides brings the cam surfaces 134 into play to allow normally open switches 138 to close. Closure of both switches 138 completes a circuit (starting at the buss Z) from lead 160 to the right hand switch 138, to lead 161 which runs to the left hand switch 138, to lead 162 and signal lamp SL, and from the signal lamp SL to the buss Y. The signal lamp will light up indicating that both safety locking pins 118 are properly seated. It is observed that the signal lamp circuit connects the switches 138 in series so that if one pin 118 fails to seat properly the lamp will not go on. Assuming the pins seat properly the mechanic can release button R and the pins thereafter carry the load to relieve the motor means 108 and avoid the need to keep the air supply on. Thus, the solenoid valve 124 will return to closed position since its circuit across busses Y and Z will be opened by release of button R.

When the vehicle is leveled on the rack, the mechanic can set the safety chocks 27 by raising the same to locked positions due to the snap action of means 87 and 89 (FIG. 14). Of course, the chocks 27 may be set in locked positions before the runways 32 are raised, and they may be released before the runways 32 are lowered. The solenoid motor means 94 for lowering the chocks 27 from a remote position are in a separate circuit which include control button RC and lead 154 to branch leads 163. Each solenoid motor means 94 is connected to the buss Z by a lead 164 to complete the circuit.

On lowering the runways 32, the mechanic depresses button L and holds it depressed until the runways 32 are fully down adjacent the run-on aprons 37. On initially depressing button L a circuit is made from buss Y and lead 151 to lead 165 which, in turn, connects at the center post of the right hand toggle switch 136 and with a lead 166 which connects with the center post of the left hand toggle switch 136. Since both toggles are in the dotted line position current will flow in lead 165 to the right hand switch 136, and to lead 167 and lead 152 for the air supply to solenoid valve 124 and to leads 153 and 160 to buss Z. A current carrying lead 168 connected to the leads 153 and 160 from buss Z connects to the air exhausting solenoid valve 123 and from there a lead 169 connects with the now open contact at right hand toggle switch 136 such that upon retraction of the pin 118 the toggle switch 136 will complete the circuit from lead 169 to lead 165, switch L and the common lead 151 from buss Y.

Before the toggle switches 136 leave the broken line positions, it will be noted that the current on leads 165, 166, and 167 connect to lead 152, and from there (since switch R is open) to lead 155, right hand solenoid 130, back through right hand toggle switch 136, to left hand toggle switch 136 by lead 157 and left hand solenoid 130, then by lead 159 to the buss Z. Thus the solenoids are energized to retract the pins 118 as soon as the load has been removed by the motor means 108. When the pins retract, the right hand toggle switch 136 sets up the circuit above described to open the exhaust solenoid valve 123, while deenergizing the supply solenoid valve 124 which closes.

As is shown in FIGS. 1 and 2, the control box 150 is located near the operator's position when seated in a vehicle so that the controls may be operated from that vantage point without having to leave the vehicle. It can be appreciated from FIG. 2 that the lift runways 32 may be a fixed surface up to the point where the removable runway bridges 30 are located, and thereafter the spaced front stand units 22 can be set in a pit having a depth substantially equal to that of the height of runways 32 so that the wheel supporting carriages 25 are at the level of the runways 32. In this latter installation, the hoist units 34 can be dispensed with, but the advantages of having the removable bridge means 30 are still retained.

Figure 4:
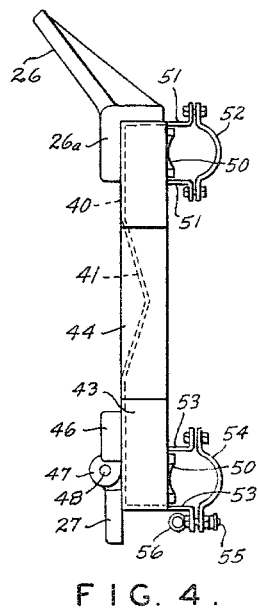
FIG. 4 is an elevational view of the wheel carriage as seen from the right side in FIG. 3.
Figure 5:
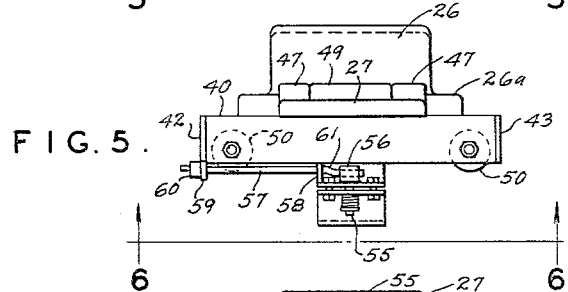
FIG. 5 is an end elevational view of the wheel carriage seen at line 5—5 in FIG. 3.
Figure 6:
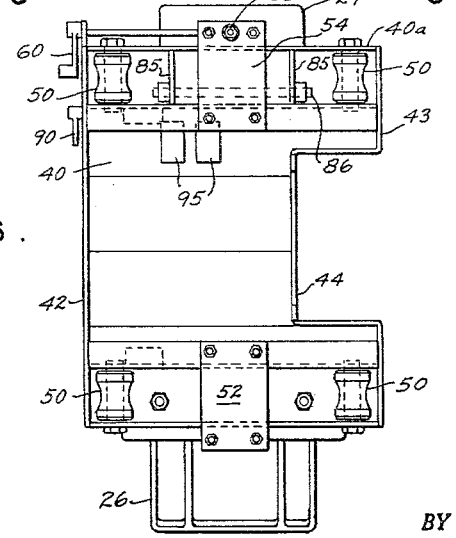
FIG. 6 is a view of the wheel carriage from the under side thereof, the view being taken at line 6—6 in FIG. 5.

It is pointed out that the brake means 54 of FIGS. 4 and 5, and its actuating means 60, is used for securing the pivoted end of runways 32 on the rails 29, and for securing the run-on ends 32a of the runways on the rails 36. Therefore, it is deemed unnecessary to repeat the disclosure of FIGS. 4 and 5 since the indication of handles 60 in FIG. 1 is sufficient for this purpose. The runways 32 may be moved independently to the proper spacing, or one only may be adjusted. The same adjustment is needed for the wheel supporting carriages 25 for proper longitudinal alignment.

The foregoing description has related to a preferred embodiment of the present invention, but it is understood, of course, that changes and modifications can be made therein, as well as rearrangements of combinations and sub-assemblies of parts, without departing from the scope of the invention as set forth in the appended claims.

What is claimed is:

1. In a vehicle service rack, in combination: raised vehicle front wheel supporting carriages; inclined vehicle rear wheel supporting runways; means supporting first ends of said runways substantially at the elevation of said raised carriages; removable runway bridges connecting said first runway ends and said carriages; hoist units operably connected with second ends of said runways to lift said second ends for levelling said runways and elevating the vehicle thereon; a first vehicle wheel stop on each carriage remote from said runway bridges; a second vehicle wheel stop on each carriage adjacent said runway bridge, each of said second stops being movable between positions substantially flush with the adjacent runway bridges and positions elevated with respect to the adjacent runway bridges, and each of said second stops having a position control arm thereon; a spring operated detent on each carriage releasably engageable with said position control arm to retain said second stops in elevated vehicle wheel stopping position; motor means on each carriage adjacent said detents and operable to effect release of said detents from said position control arms; motor operated safety lock elements engageable with said hoist units to releasably lock said supporting runways in elevated positions; and a control system including a control box and circuit connections between said control box and each of said motor means and motor operated safety locking elements, said control box having a first element to energize said safety lock elements to release said hoist units for lowering said wheel support runways and a second element to energize said detent motor means to release said detents from said position control arms.

2. A vehicle service rack comprising a pair of wheel stands, a fixed stand spaced from each wheel stand, said stands being supported from a common surface and having upper ends raised above the common surface, a hoist unit rested on the common surface and spaced from each of said fixed stands at the opposite side thereof from said respective wheel stands, bridge means extending between and supported from the upper ends of said fixed and wheel stands, runway means pivoted adjacent one end on each of said fixed stands in alignment with said bridge means and connected near its opposite end to a hoist unit so as to be in a normal inclined position, said runway means forming the connection between said fixed stand and said hoist unit to permit a forward vehicle wheel to pass upwardly along said runway means and cross said bridge means onto said wheel stand with a trailing vehicle wheel remaining on said inclined runway means, each of said hoist units including a runway lift arm pivotally supported adjacent one end from the hoist unit, each of said runway lift arms having a first portion of short length at said one end and a second portion of relatively longer length and angularly related with said first portion, the second portion including the other end of said lift arm being slidably connected to said runway means, and motor means connected to said lift arm at the junction of said angularly related arm portions to swing said arm about its pivot support and elevate the opposite end and the connected runway means above the common surface to substantially level said runway means with said bridge means.

References Cited by the Examiner

UNITED STATES PATENTS

| | | | |
|---|---|---|---|
| 982,977 | 1/11 | Morgan | 254—124 X |
| 1,656,743 | 1/28 | Littell | 254—88 |
| 1,718,795 | 6/29 | Morton | 188—43 |
| 1,846,537 | 2/32 | Withrow | 188—42 |
| 1,862,682 | 6/32 | Judd | 254—88 X |
| 1,901,103 | 3/33 | Judd. | |
| 1,942,945 | 1/34 | Smith | 187—8.72 |
| 1,953,670 | 4/34 | Cochin. | |
| 1,955,586 | 4/34 | Hott et al. | 187—8.52 |
| 1,979,788 | 11/34 | Bacher | 187—8.52 |
| 2,025,051 | 12/35 | Haucke | 33—203.12 |
| 2,045,109 | 1/36 | Smith | 33—203.12 |
| 2,053,368 | 9/36 | Hott | 187—8.52 |
| 2,201,189 | 5/40 | Makaroff et al. | 187—8.49 |
| 2,250,965 | 7/41 | Pritz | 187—8.59 X |
| 2,576,544 | 11/51 | Smith | 187—8.52 X |
| 2,611,579 | 9/52 | Guzey et al. | 187—8.71 X |
| 2,708,986 | 5/55 | Hott et al. | 187—8.41 |
| 2,962,980 | 12/60 | Carrigan | 187—8.67 X |
| 3,088,547 | 5/63 | MacMillan | 187—8.54 |

FOREIGN PATENTS 59,475  6/38  Norway.

SAMUEL F. COLEMAN, *Primary Examiner.*

KARL J. ALBRECHT, *Examiner.*